United States Patent
Li et al.

(10) Patent No.: US 8,077,956 B2
(45) Date of Patent: Dec. 13, 2011

(54) ORIENTATION DETECTION FOR CHEST RADIOGRAPHIC IMAGES

(75) Inventors: Ruiping Li, Rockville, MD (US); Zhimin Huo, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 669 days.

(21) Appl. No.: 12/259,346

(22) Filed: Oct. 28, 2008

(65) Prior Publication Data
US 2010/0104163 A1  Apr. 29, 2010

(51) Int. Cl.
*G06K 9/00* (2006.01)
(52) U.S. Cl. ....................................... 382/132
(58) Field of Classification Search ............ 378/62; 382/128, 130, 131, 132
See application file for complete search history.

(56) References Cited

U.S. PATENT DOCUMENTS

| | | | |
|---|---|---|---|
| 5,862,249 A | 1/1999 | Jang et al. | |
| 7,088,851 B2 * | 8/2006 | Shinbata | 382/132 |
| 7,315,635 B2 * | 1/2008 | Oosawa | 382/128 |
| 7,352,888 B2 | 4/2008 | Luo et al. | |
| 7,447,349 B2 * | 11/2008 | Seigneret | 382/154 |
| 7,574,028 B2 * | 8/2009 | Luo et al. | 382/128 |

OTHER PUBLICATIONS

Ruiping Li et al., A Fuzzy Neural Network for Pattern Classification and Feature Selection, Fuzzy sets and systems, 130 (2002) 101-108.

* cited by examiner

*Primary Examiner* — Irakli Kiknadze

(57) ABSTRACT

A method for identifying the orientation of a radiographic image of a patient generates a reduced-scale image having a smaller number of pixel elements than the original radiographic image and generates a reduced bit-depth image from the reduced-scale image. The method determines whether the image has portrait or landscape orientation by sectioning either the reduced-scale image or the reduced bit-depth image into at least two sections and calculating at least one value related to relative symmetry for each of the at least two sections.

18 Claims, 7 Drawing Sheets

US 8,077,956 B2

ORIENTATION DETECTION FOR CHEST RADIOGRAPHIC IMAGES

FIELD OF THE INVENTION

The invention relates generally to diagnostic imaging and more particularly to methods for detection of image orientation. More specifically, the invention relates to a method and system for orientation detection in frontal view chest radiographic images.

BACKGROUND OF THE INVENTION

Chest x-ray images or chest radiographic images aid in patient diagnosis. Thoracic images of this type are used to diagnose medical conditions including lung and breast cancers and emphysema as well as to detect therapeutic devices, such as endotracheal tubes in the intensive care unit (ICU). Because it yields considerable useful information about the condition of a patient, the thoracic radiographic image is often of primary importance in diagnosis and monitoring of critically ill patients and may be the only radiographic examination performed in some cases.

Digital and digitized chest radiographs are used for various time-critical functions in the intensive care unit (ICU) and for computer-aided detection (CAD). One difficulty with handling these images relates to the orientation of the image, which is not standardized in practice or between systems. Chest radiographs can be obtained as either postero-anterior (PA) or anterior-posterior (AP) images. The image data orientation can be portrait, so that the upright image of the patient appears head-up or head-down, or landscape, so that the upright image of the patient appears head-left or head-right.

Images may require rotation for proper viewing and/or for proper input to a CAD or other image analysis system. In some instances, orientation of image data is determined by a partially manual process in which a radiologist determines the proper orientation of the image prior to its input to CAD or other systems. It can be appreciated, however, that handling images in this way can be inefficient, is often a poor use of the radiologist's time, and can delay timely processing and automated analysis of the x-ray image.

U.S. Pat. No. 5,862,249 entitled "Automated method and system for detection of positional orientation of digital radiographic images" to Jang et al. relates to a method that performs feature extraction on the image data, then employs a set of rules, obtained and refined in a training process, in order to ascertain the positional orientation of an image. Solutions such as that proposed in the Jang et al. '249 disclosure, although they may exhibit a reasonable degree of accuracy, can be computationally expensive and require time for training under different conditions.

One notable difficulty in determining image orientation relates to the considerable amount of image data that must be processed. Images obtained at 10-bit or higher bit-depth (related to intensity resolution) and having spatial resolution requiring millions of pixels are very large, making it difficult to process image data using feature extraction or other computationally intensive utilities.

Accordingly, there is a need for a solution to the problem of orientation detection for thoracic and other x-ray images that does not require training and fine-tuning and that executes quickly and accurately, and that can operate automatically without the need for continual human supervision.

SUMMARY OF THE INVENTION

It is an object of the present invention to advance the art of orientation detection for digital radiographic images. With this object in mind, the present invention provides a method for identifying the orientation of a radiographic image of a patient. The method can comprise: generating a reduced-scale image having a smaller number of pixel elements than the original radiographic image; generating a reduced bit-depth image from the reduced-scale image; and determining whether the image has portrait or landscape orientation by: sectioning either the reduced-scale image or the reduced bit-depth image into at least two sections, and calculating at least one value related to relative symmetry for each of the at least two sections.

The present invention can provide a method for detecting relative image orientation that is less computationally demanding than earlier solutions.

The present invention can provide a method that allows image orientation to be determined quickly, without the need for extensive training or human supervision.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily shown to scale relative to each other.

DETAILED DESCRIPTION OF THE INVENTION

Figure 1:
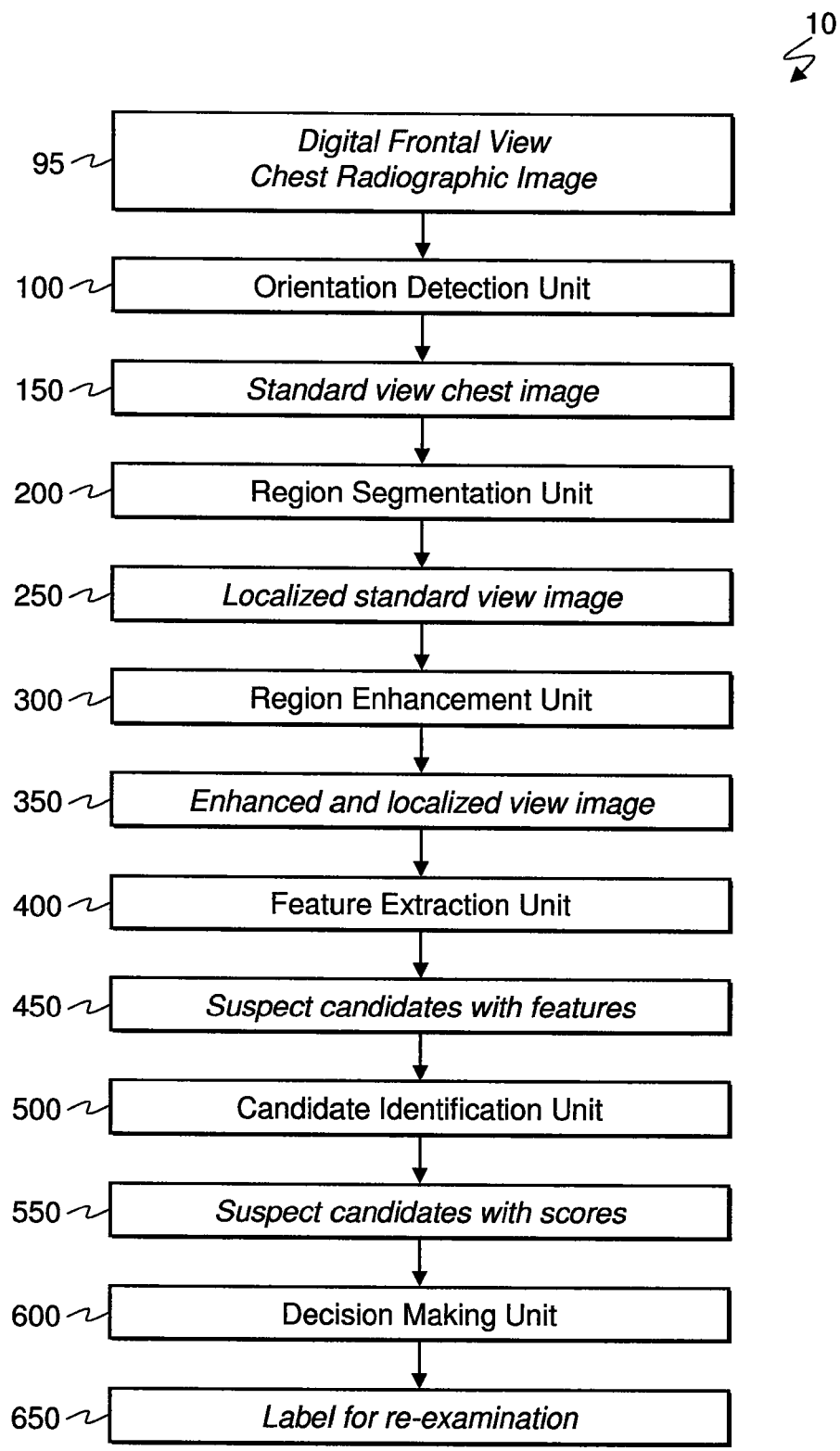
FIG. 1 is a block diagram of computer and machine-based detection application for abnormalities based on frontal view chest radiographic images, such as artifact detection.

The following is a detailed description of the preferred embodiments of the invention, reference being made to the drawings in which the same reference numerals identify the same elements of structure in each of the several figures.

In the context of the present disclosure, a frontal view chest radiographic image may be a postero-anterior (PA) or anterior-posterior (AP) view image. While the description that follows is largely directed to particular structures and problems relating to image orientation for chest radiographic images, it should be emphasized that similar methods could alternately be employed for image orientation detection with other types of diagnostic images.

A "computer" refers to any control logic processing apparatus that is capable of accepting a structured input, processing the structured input according to prescribed rules, and producing results of the processing as output. Examples of a computer include: a personal computer such as a laptop; a general purpose computer; a supercomputer; a mainframe; a super mini-computer; a mini-computer; a workstation; a microcomputer; a server; an interactive television; a hybrid combination of a computer and an interactive display; and application-specific hardware that emulates a computer and/or software. A computer can have a single processor or multiple processors, which may or may not operate in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of computer-readable media include: a magnetic hard disk; a floppy disk; an optical disk, such as a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: code segments; instructions; computer programs; and programmed logic.

A "computer system" refers to a system having a computer, wherein the computer comprises computer-readable media embodying software to operate the computer.

A "network" refers to a number of computers and associated devices that are connected by communication facilities. A network involves permanent connections such as cables or temporary connections such as those made through telephone or other communication links, including wireless communication links. Examples of a network include: an internet connection, such as the Internet; an intranet; a local area network (LAN); a wide area network (WAN); and a combination of networks, such as an internet and an intranet.

A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The block diagram of FIG. 1 shows a succession of processing operators that work together in a diagnostic system 10 in order to obtain diagnostic information from a digital front view chest radiographic image 95. Diagnostic system 10 can be used, for example, to detect a medical condition, such as lung nodules or to detect the presence of tubing, such as ET tubing or other therapeutic device.

With respect to FIG. 1, embodiments of the present invention are directed to the work of an orientation detection unit 100 that provides, as its output, a standard view chest image 150. Standard view chest image 150 then provides the image data from the chest x-ray that is processed by a number of processing operators in succession, each taking the input from the preceding operation and providing image data output in some form. In the particular example of FIG. 1, a region segmentation unit 200 provides a localized standard view image 250. A region enhancement unit 300 then provides an enhanced and localized view image 350. A feature extraction unit 400 then indicates suspect candidates with features 450. A candidate identification unit 500 assigns suspect candidates with scores 550. Lastly, a decision making unit 600 assigns a label for re-examination 650 to any of the suspected abnormalities that were detected. As shown in the processing sequence of FIG. 1, positional orientation information of an image influences the performance of the entire detection system. Obtaining correct positional orientation information early in the processing sequence helps to improve detection accuracy and to speed processing time. Conversely, missing or incorrect positional orientation information would have a negative impact on detection accuracy.

It is noted that exemplary diagnostic system 10 is one example of an image analysis system for which orientation detection as provided by embodiments of the present invention is of particular value. Orientation detection unit 100 could alternately be used in other applications, including display applications that are capable of rotating or inverting the obtained radiographic image in order to display the image in a standard view perspective, for example. For PA and AP chest images, the patient's head and upper torso serves as a useful type of benchmark feature. Other benchmark features could be used for images of different parts of the body.

Figure 2:
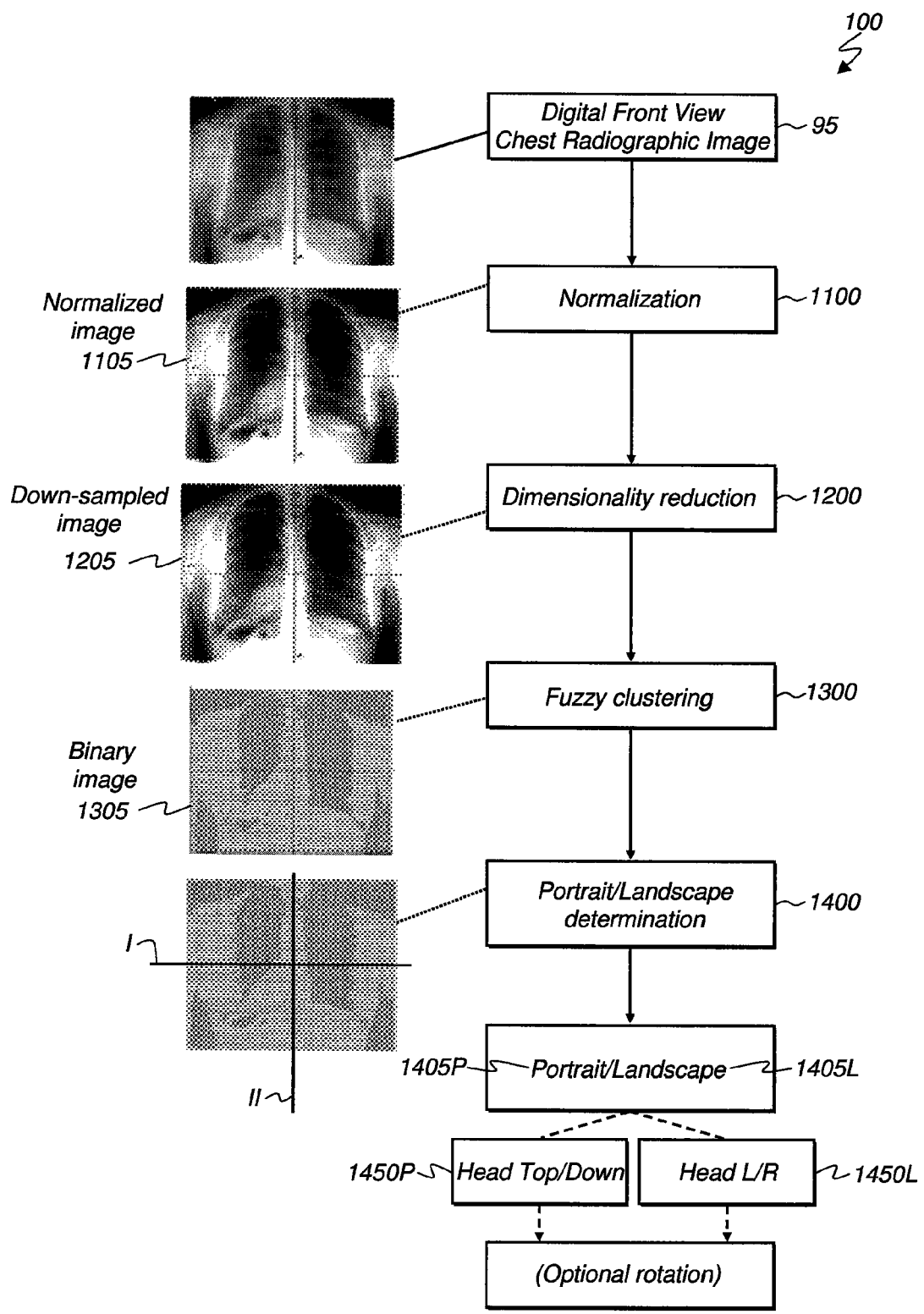
FIG. 2 is a flow chart illustrating a first portion of steps in an embodiment of the orientation detection unit of FIG. 1.

The logic flow diagram of FIG. 2 shows an initial portion of the sequence in orientation detection unit 100 that provides orientation detection according to an embodiment of the present invention. An optional image normalization step 1100 is executed upon chest radiographic image 95 in order to provide a normalized image 1105. Image normalization is performed in order to enhance image contrast, which is particularly useful over the lung area, which is otherwise of relatively low contrast. In one embodiment, for example, histogram equalization is used to generate normalized image 1105 as non-negative for any pixel values, with black pixels at a lower value than white.

Still referring to FIG. 2, a dimensionality reduction step 1200 generates a down-sampled image 1205 with a smaller number of pixel elements than the original radiographic image in order to speed up the orientation detection process. In one embodiment, resampling is designed to keep informative characteristics shown in the original image data. In one embodiment, for example, with any of CR or DR digital radiographic images, or with digitized X-ray images from film, a reduction factor (RF) of 4 is a reasonable setting, which means that down-sampled image 1205 has one-fourth the pixel elements but still retains a good portion of the information shown in the original image, such as what would be needed for artifact detection, tube detection, or nodule detection, for example. After this reduction in size, subsequent processing reduces the bit depth of the down-sampled image in order to speed orientation detection processing even further.

Figure 3:
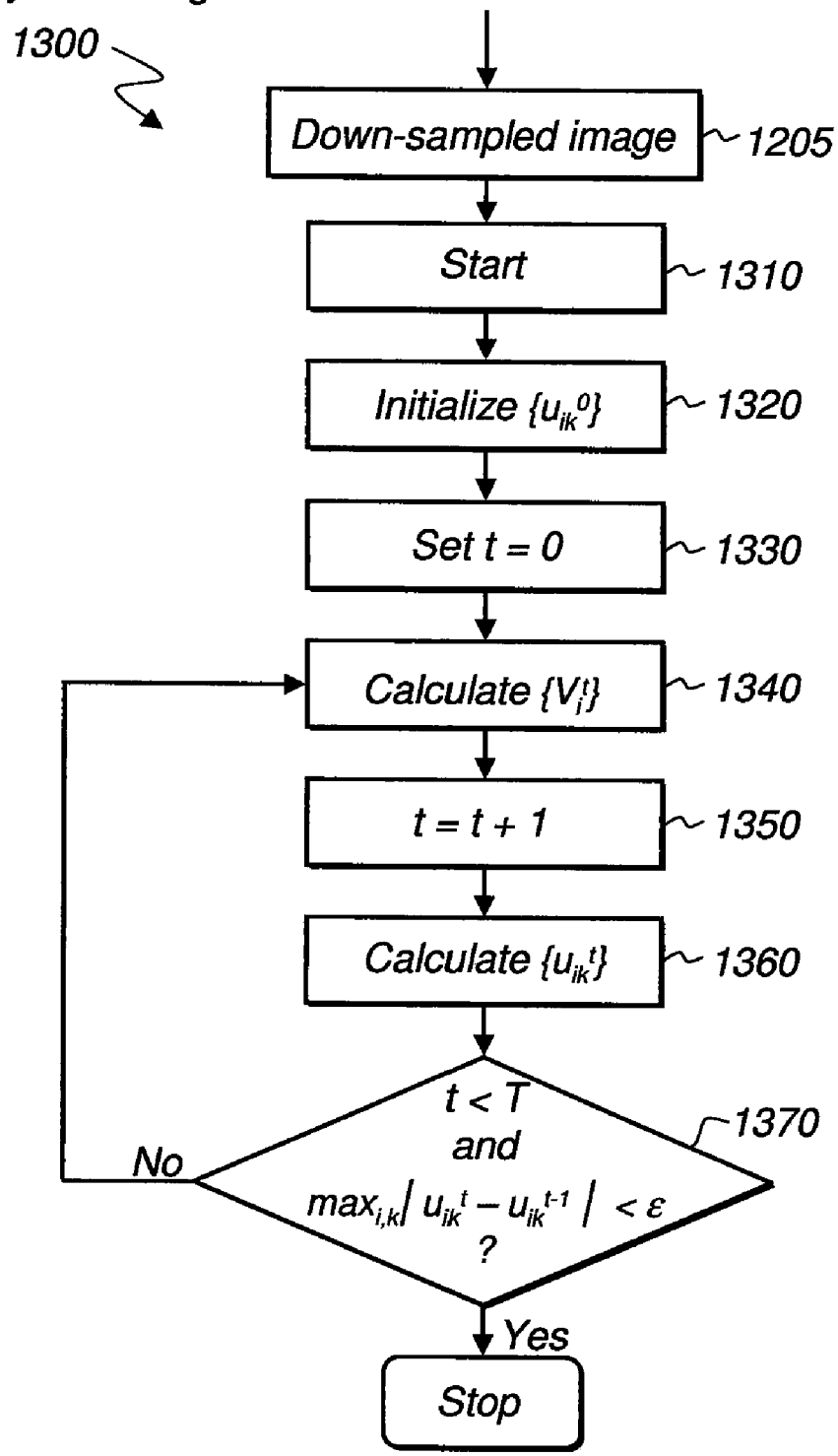
FIG. 3 is a logic flow diagram showing steps for fuzzy clustering in one embodiment.

Still following the process of FIG. 2, a clustering step 1300 is executed on down-sampled image 1205 in order to reduce its bit depth. In one embodiment of the invention, a Gaussian clustering method (GCM) is employed as a fuzzy clustering method for clustering step 1300. Fuzzy clustering is an unsupervised learning technique for pattern recognition by which a group of objects is split up into a variable number of subgroups based on a measure function. GCM is one of the most commonly used clustering methods and uses a parametric distribution as a model. This method is distinct from a fuzzy c-means (FCM) method, which is an iterative method of clustering that seeks to minimize an objective function and allows a single data element to belong to two or more clusters. GCM has a complete Gaussian membership function derived by using a maximum-fuzzy-entropy interpretation. FIG. 3 shows a flow chart of fuzzy clustering step 1300 in one embodiment. In FIG. 3, $$u_{ik} = \exp\left[-\frac{\|x_k - v_i\|^2}{2\sigma^2}\right] / \sum_{j=1}^{c} \exp\left[-\frac{\|x_k - v_j\|^2}{2\sigma^2}\right],$$

$$i = 1, 2, \ldots c; k = 1, 2, \ldots N.$$

and $$v_i = \sum_{k=1}^{N} u_{ik} x_k / \sum_{k=1}^{N} u_{ik}, i = 1, 2, \ldots c.$$

Here, the variable $x_k$ represents the k-th data, that is, the k-th pixel; $v_i$ represents the center vector of cluster i. Variable $u_{ik}$ represents membership assignment, that is the degree to which the data k belongs to cluster i. The value σ is a positive constant and is greater than zero, which represents the "fuzziness" of classification. Variable T represents the maximum number of iterations, ε is a small positive number that determines the termination criterion of the algorithm. Values N and c represent the number of data and number of clusters, respectively. Note that in FIG. 3, the superscripts denote iteration number. After about ten iterations, both of the center vectors and membership function substantially converge.

This method for fuzzy clustering is further described in Li, R. and Mukaidono, M., "Gaussian clustering method based on maximum-fuzzy entropy interpretation", *Journal of Fuzzy Sets and Systems*, 102 (1999), pp. 253-258. In one embodiment of the present invention, c is set as 2, which means that the reduced bit-depth image after clustering is a binary image. Other values of c could be used; low values are advantaged for providing simpler computation than higher values. Other clustering algorithms such as thresholding and self-organizing techniques could alternately be employed.

Figure 4A:
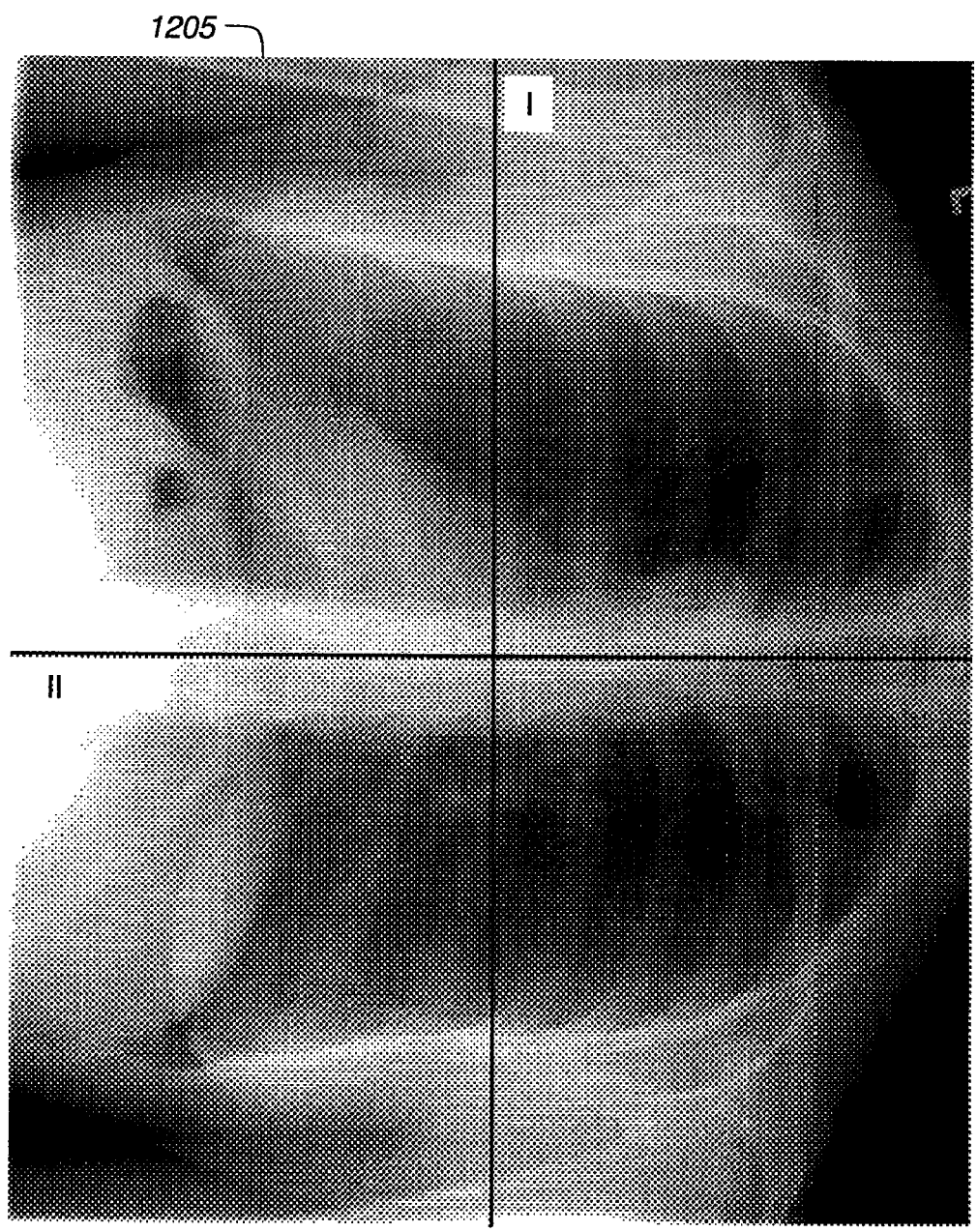
FIG. 4A is a size-reduced (down-sampled) and normalized landscape chest image.
Figure 4B:
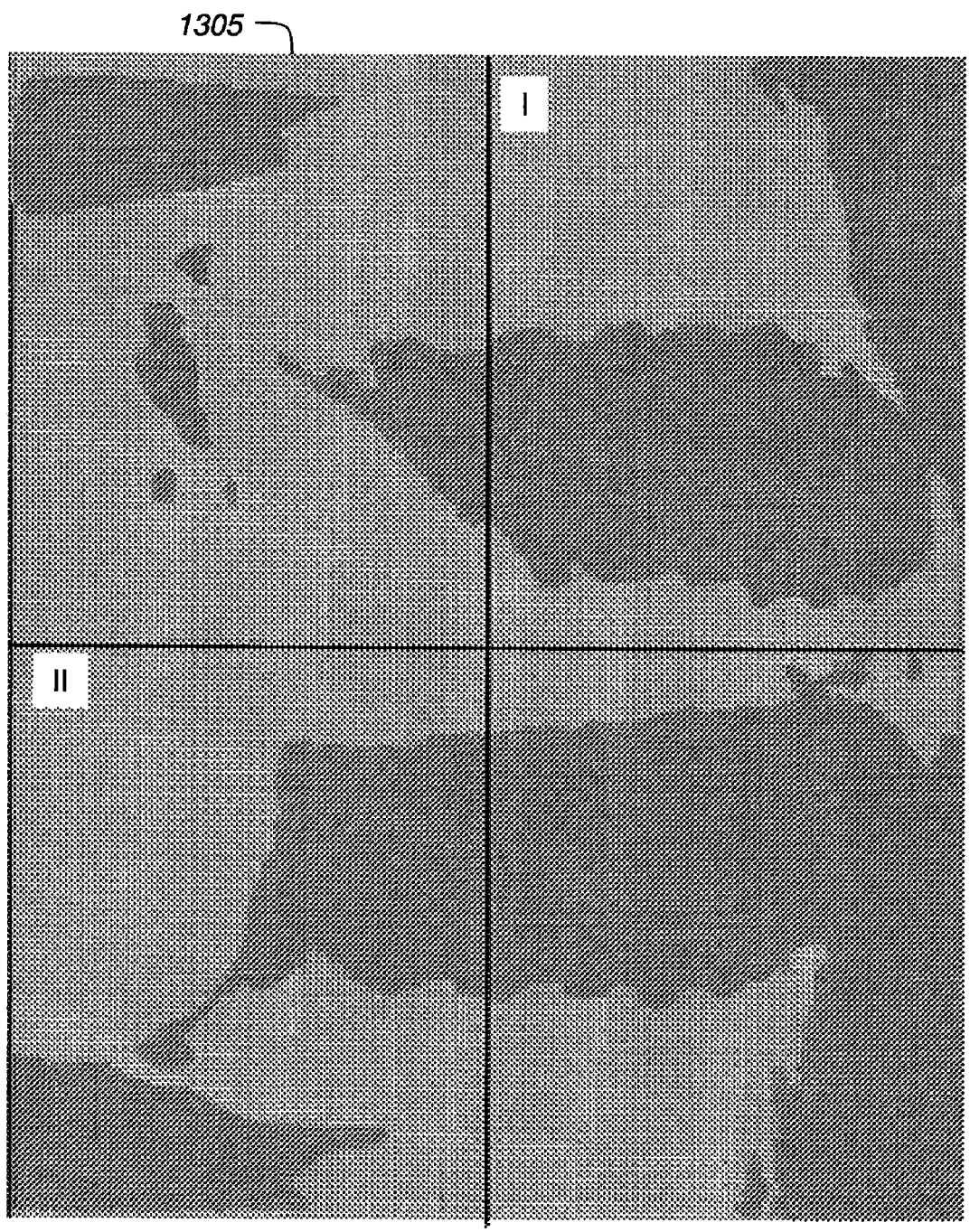
FIG. 4B is a binary image of the image in FIG. 4A, after performing fuzzy clustering.

Still referring to FIG. 3, a start step 1310 begins when down-sampled image 1205 is received. At a first initialization step 1320, variable $u_{ik}^0$ is set to an initial value. A second initialization step 1330 sets an initial zero value for t that serves as the index for the iteration. In a calculation step 1340, the first step within a loop, the value of vector V for cluster i in this iteration is computed. After a loop increment step 1350, a calculation step 1360 calculates variable $u_{ik}$ for this iteration. A test step 1370 then checks both the number of iterations and the difference between the previous and current $u_{ik}$ values to determine whether or not to terminate clustering step 1300 processing. As shown in FIG. 2, a binary image 1305, or other image having a small number of values assigned to its respective pixels, is produced as a result of fuzzy clustering procedure in clustering step 1300. By way of example, FIG. 4A shows normalized down-sampled image 1205 from step 1200 in FIG. 2; FIG. 4B shows its corresponding binary image 1305 from step 1300 in FIG. 2.

Referring back to FIG. 2, a portrait/landscape determination step 1400 detects whether the input image is portrait-oriented or landscape-oriented, by sectioning the reduced-size image and calculating and comparing its left-right symmetry and up-down symmetry, based on the normalized down-sampled image (1205). The computation itself is relatively straightforward, using techniques for evaluating image symmetry that are familiar to those skilled in the imaging arts. As shown in FIG. 4A, the image can be considered as sectioned into four quadrants. Two symmetry axes are the left-right central line (l) for sectioning and computing left-right symmetry and the up-down central line (ll) for computing up-down symmetry, respectively. Computation and comparison of the different symmetry values yield a clear indication of the axis of symmetry as either left-right central line (l) for left-right symmetry or up-down central line (ll) for up-down symmetry. Symmetry calculations and techniques are well known to those skilled in the image processing arts and can include, for example, various methods for point-by-point correlation between two sections of the image and summing of values within each section.

Figure 5A:
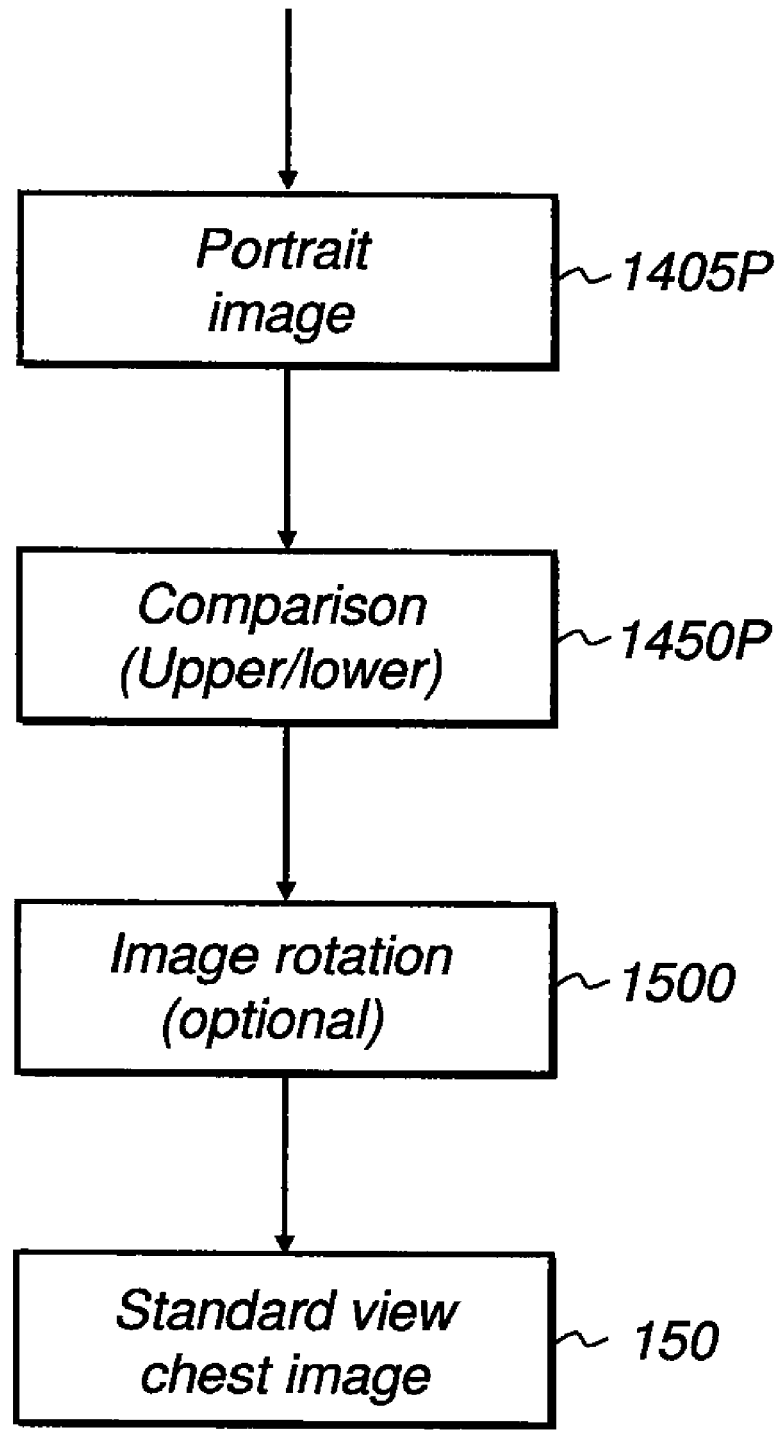
FIG. 5A is a flow chart illustrating steps in an embodiment of the identification of head-up images and head-down images for a portrait chest radiographic image.

After getting portrait/landscape information, as was shown in FIG. 2, it is then necessary to determine further the upright patient orientation. For a portrait image 1405P, it is necessary to determine whether the image orientation is upright vertical, that is, with the patient positioned head-up, -or with the patient orientation head-down and, if needed, to rotate the image accordingly. The block diagram of FIG. 5A shows the sequence used for orientation detection for portrait image 1405P. A comparison step 1450P is used to determine the upright orientation for a vertically disposed patient. In one embodiment, comparison step 1450P calculates the total dark area represented by binary pixel values in the top half of binary image 1305 and compares this value to the total dark area represented by binary pixel values in the bottom half of binary image 1305. The top half of the portrait image, with the shoulders and lung area on the side of the upper portion, contains features that are less dense, thus darker, than features below the lung area. A predominance of darker pixels thus indicates the upper portion of the torso in portrait images. An optional image rotation step 1500 is applied to the image data if needed.

Figure 5B:
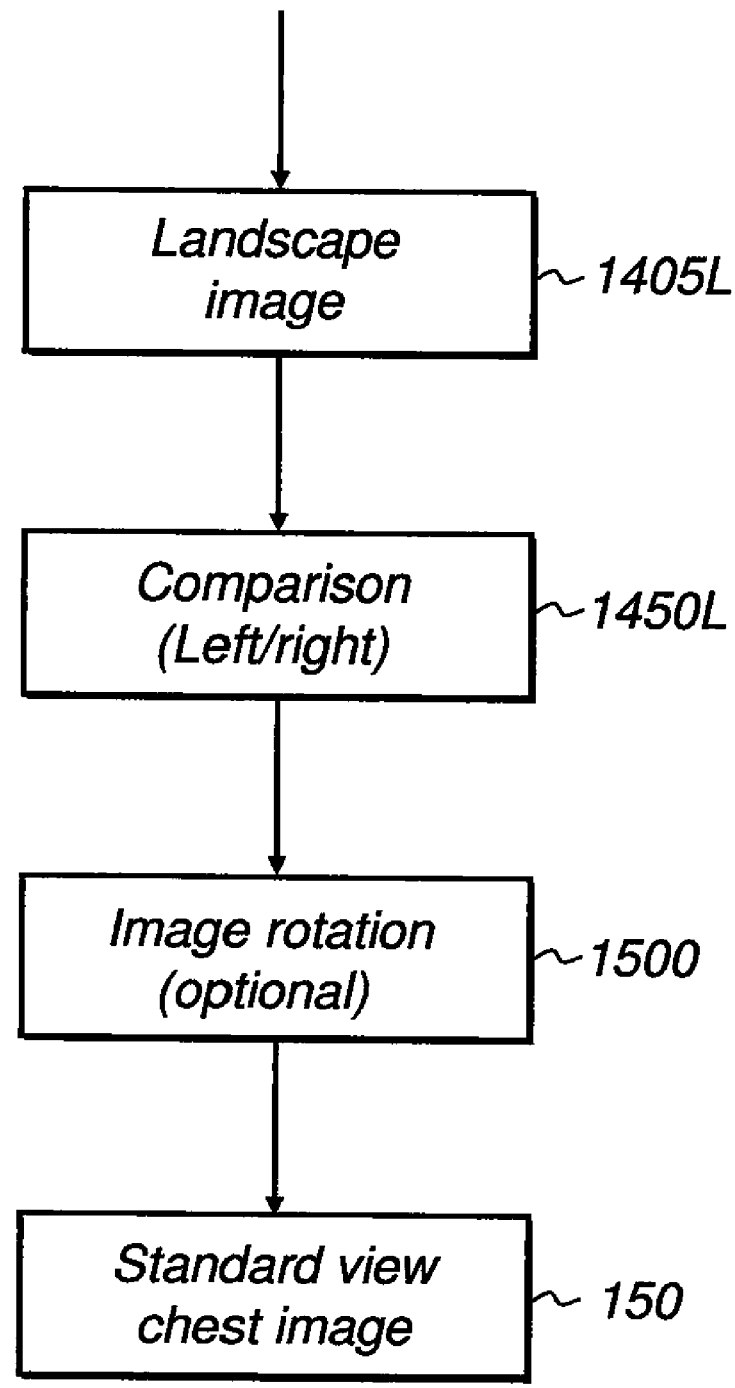
FIG. 5B is a flow chart illustrating steps in an embodiment of the identification of head-left image and head-right image for a landscape chest radiographic image.

In similar fashion, for a landscape image 1405L, it is necessary to determine whether the image has the patient's upright orientation as either head and neck toward the left-or head and neck toward the right and, if needed, to rotate the image accordingly. The block diagram of FIG. 5B shows the sequence used for landscape image 1405L. A comparison step 1450L is used to determine head-left-or head-right orientation.

In one embodiment, the binary portrait or landscape image 1305 is sectioned into quadrants and the relative symmetry or asymmetry of vertical and horizontal groupings of the quadrants considered. Thus, for example, comparison step 1450L calculates the total dark area represented by binary pixel values in the left half of binary image 1305 and compares this value to the total dark area represented by binary pixel values in the right half of binary image 1305. That half of the portrait image that contains the shoulders and lung area contains features that are less dense, thus darker, than features below the lung area. A predominance of darker pixels thus indicates the upper (head and neck) portion of the torso in landscape images. An image rotation step 1500 is applied to the image data if needed.

In various embodiments of the present invention, the logic for determining the portrait or landscape orientation of the image, and for detecting the upright or left/right patient orientation, first preprocesses an image file to reduce its size in one or more ways, then checks for symmetry of the image content and orientation within the image using the reduced-size file. This overall sequence is shown in FIGS. 2, 5A, and 5B. Using a reduced-size image is advantageous for speeding calculation time, which can be significant when considering the full image data.

The embodiment described with reference to FIG. 2 generates a reduced-scale image, with a reduced number of pixels, then generates, from this, a reduced bit-depth image, that is, a reduced resolution image. Portrait or landscape determination can use either or both of the reduced bit-depth image or the reduced-scale image. Similarly, patient upright vertical or right/left orientation logic can use either or both of the reduced bit depth or reduced scale image.

It is noted that detection of image orientation (step 1400 in FIG. 2) and of patient upright orientation within the image (steps 1450P and 1450L) using the methods of the invention is probabilistic rather than absolute. In some cases, a likely determination of the image orientation cannot be made, with sufficient certainty, from the reduced size image, such as from the reduced bit depth image. This can happen, for example, where the patient position is somewhat oblique with respect to the orthogonal edges of the image. Where this is the case, system logic can then alternately perform more conventional analysis on the original image data in order to obtain this information.

Although the present description is focused on image processing, artifact detection, tube identification, and nodule detection in frontal view PA or AP chest radiographic images, the general approach that is described herein can be expanded for use with other types of images. Images of skeletal structures, for example, may also exhibit symmetry characteristics for which this method is readily adaptable.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. Diagnostic system
95. Chest radiographic image
100. Orientation detection unit
150. Standard view chest image
200. Region segmentation unit
250. Localized standard view image
300. Region enhancement unit
350. Enhanced and localized view image
400. Feature extraction unit
450. Suspect candidates with features
500. Candidate identification unit
550. Suspect candidates with scores
600. Decision making unit
650. Label for re-examination
1100. Image normalization step
1105. Normalized image
1200. Dimensionality reduction step
1205. Down-sampled image
1300. Clustering step
1305. Binary image
1310. Start step
1320. Initialization step
1330. Initialization step
1340. Calculation step
1350. Loop increment step
1360. Calculation step
1370. Test step
1400. Portrait/landscape determination step
1405L Landscape image
1405P. Portrait image
1450L, 1450P. Comparison step

What is claimed is:

1. A method for identifying the orientation of a radiographic image of a patient, the method comprising:
    generating a reduced-scale image having a smaller number of pixel elements than the original radiographic image;
    generating a reduced bit-depth image from the reduced-scale image; and
    determining whether the image has portrait or landscape orientation by:
    sectioning either the reduced-scale image or the reduced bit-depth image into at least two sections; and
    calculating at least one value related to relative symmetry for each of the at least two sections.

2. The method of claim 1 wherein generating a reduced-scale image comprises sub-sampling the radiographic image.

3. The method of claim 1 further comprising processing the image data to enhance contrast.

4. The method of claim 3 wherein processing the image data to enhance contrast comprises applying a normalization algorithm to the image data.

5. The method of claim 1 wherein generating a reduced bit-depth image comprises executing a clustering operation.

6. The method of claim 5 wherein executing a clustering operation comprises using one or more techniques from the group consisting of fuzzy c-means (FCM), Gaussian clustering method (GCM), thresholding, and self-organizing techniques.

7. The method of claim 1 further comprising determining the relative upright orientation of the patient.

8. The method of claim 7 wherein determining the relative upright orientation of the patient comprises evaluating symmetry of the reduced bit-depth image in four quadrants.

9. The method of claim 7 further comprising rotating the image according to the relative upright orientation of the patient.

10. A method for identifying the orientation of a radiographic image of a patient, the method comprising:
    generating a reduced-scale image having a smaller number of pixel elements than the original radiographic image by sub-sampling; and
    determining whether the image has portrait or landscape orientation by:
    sectioning the reduced-scale image into at least two sections; and
    calculating at least one value related to relative symmetry for each of the at least two sections of the reduced-scale image.

11. The method of claim 10 wherein generating a reduced-scale image comprises sub-sampling the radiographic image.

12. The method of claim 10 further comprising processing the image data to enhance contrast.

13. The method of claim 12 wherein processing the image data to enhance contrast comprises applying a normalization algorithm to the image data.

14. A method for identifying the orientation of a radiographic image of a patient, the method comprising:
    a) re-sampling the image data to provide a down-sampled image;
    b) performing a clustering operation on the down-sampled image to generate a binary image;
    c) determining whether the image orientation is portrait or landscape according to symmetry of the down-sampled image provided in step a); and d) determining an upright position of the patient according to symmetry of the binary image generated in step b).

15. The method of claim 14 further comprising processing the image to enhance contrast.

16. The method of claim 14 wherein determining the upright position of the patient comprises summing pixel values within one or more quadrants of the binary image.

17. The method of claim 14 wherein the radiographic image is a posterior-anterior (PA) or anterior-posterior (AP) chest radiographic image.

18. The method of claim 14 further comprising rotating the image according to the upright position of the patient.

* * * * *